June 17, 1947.                E. J. WEBER                2,422,604
                        GAS PURITY TESTING DEVICE
                        Filed May 28, 1943        2 Sheets-Sheet 1
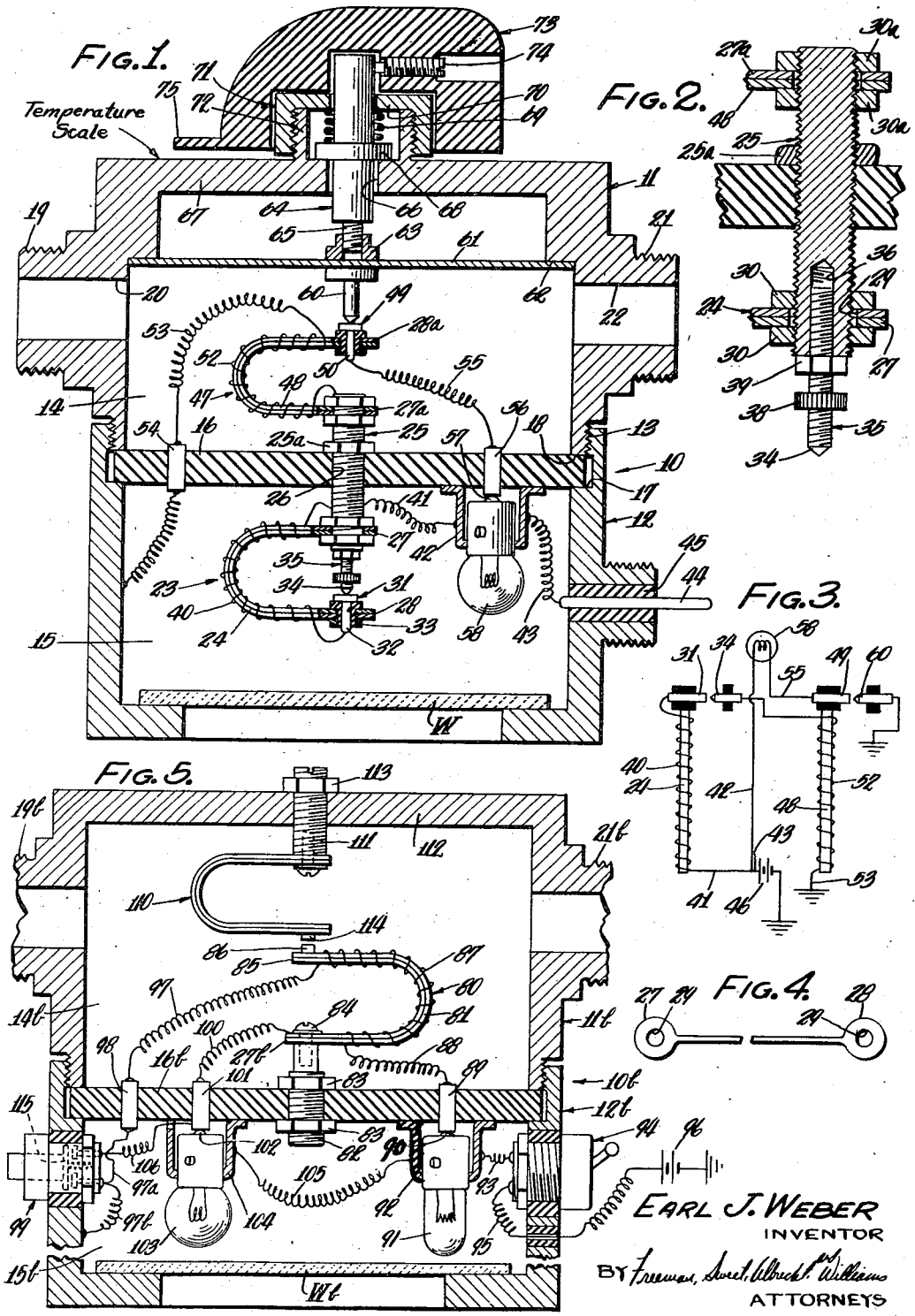
EARL J. WEBER
INVENTOR
BY Freeman, Sweet, Albrecht, Williams
ATTORNEYS June 17, 1947.　　　E. J. WEBER　　　2,422,604
GAS PURITY TESTING DEVICE
Filed May 28, 1943　　　2 Sheets-Sheet 2
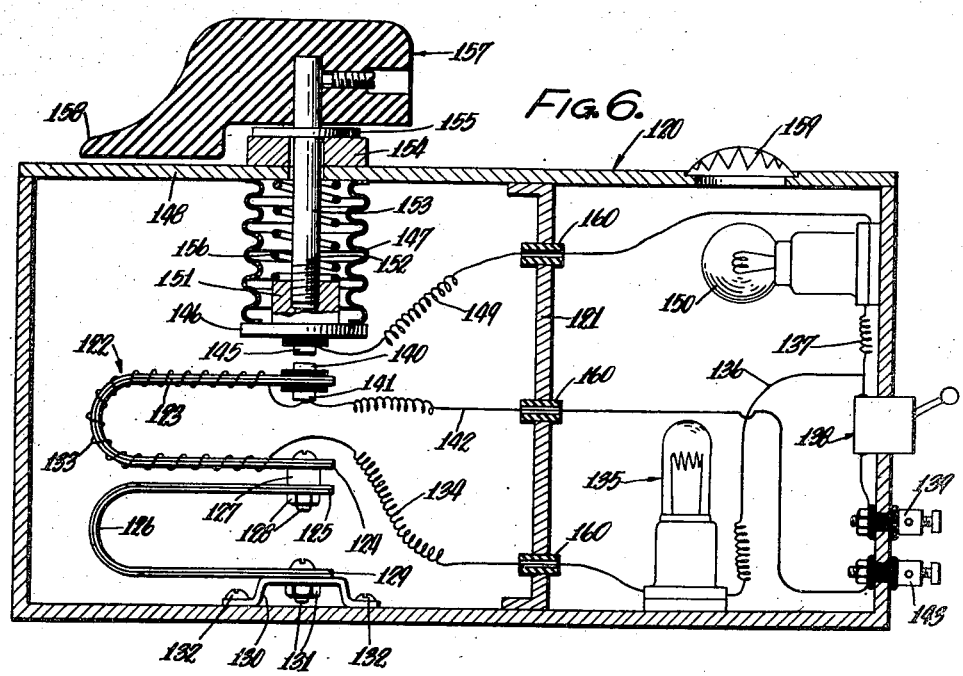
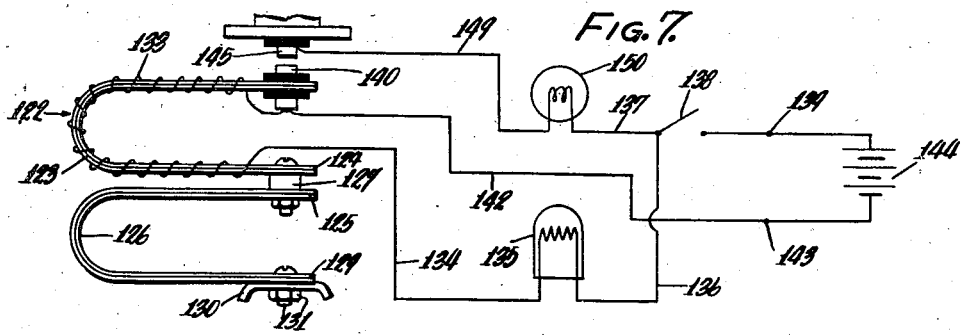
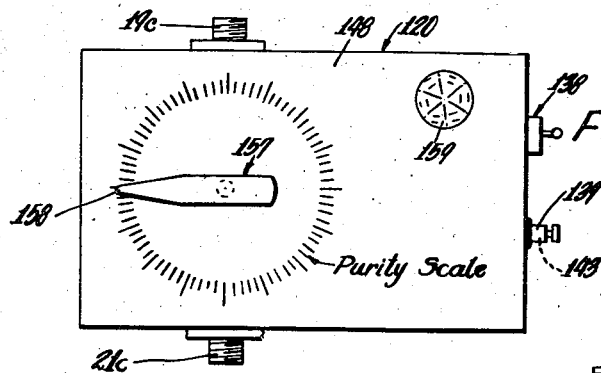
EARL J. WEBER
INVENTOR
BY Freeman, Sweet, Albrecht and Williams
ATTORNEYS Patented June 17, 1947

2,422,604

UNITED STATES PATENT OFFICE 2,422,604

GAS PURITY TESTING DEVICE

Earl J. Weber, Cleveland, Ohio, assignor to American Gas Association, Inc., Cleveland, Ohio, a corporation of New York Application May 28, 1943, Serial No. 488,947

6 Claims. (Cl. 177—311)

This invention relates to means for testing gases and more particularly the purity of a given gas, and the principal object of the invention is to provide new and improved means of this type.

In the drawings accompanying this specification, and forming a part of this application, there are shown, for purposes of illustration, several embodiments of the invention, and in these drawings:

Figure 1 is a vertical sectional view of one embodiment of the invention,

Figure 2 is a fragmentary sectional view of a detail of Figure 1, on a larger scale, Figure 3 is an electrical diagram of the embodiment shown in Figure 1, Figure 4 is a developed view of a detail part, Figure 5 is a vertical sectional broken view of another embodiment of the invention, Figure 6 is a vertical sectional view of still another embodiment of the invention, Figure 7 is an electrical diagram of the embodiment shown in Figure 6, and Figure 8 is a plan view of the embodiment shown in Figure 6.

Referring first to the embodiment shown in Figure 1, the apparatus here shown comprises a metallic casing 10 which in this instance includes two generally cylindrical parts 11, 12 joined by cooperating threads 13 and divided into two cells or chambers 14, 15 by a partition 16 in this instance an insulating disc clamped between a shoulder 17 on the part 12 and the end 18 of the part 11.

The chamber 14 is for receiving the gas to be tested and to this end the part 11 is provided with a threaded nipple 19 having a hole 20 leading to the inside of the chamber 14, through which gas from the source of gas to be tested may be introduced into the chamber. Another threaded nipple 21, having a hole 22 communicating with the chamber 14, is provided to permit the gas to be tested to displace any air or gas previously in the chamber. The nipple 21 may have connected thereto a conduit having a shut-off valve (not shown) interposed therein, so that after a charge of the gas to be tested fills the chamber 14 the chamber may be sealed. Any other means for accomplishing the same purpose may, of course, be provided.

The other chamber, 15, is intended to contain a standard gas which in this instance may be air. The disclosed apparatus will be described, for purposes of convenience, with reference to the testing of the purity of helium, that is, whether the gas in the chamber 14 is 100% pure helium or whether it contains some percentage of air. It will however be apparent, as the description of the invention proceeds that the apparatus is not limited to testing the purity of helium, but that the invention may be used for testing other gases and gas mixtures.

Disposed in the chamber 15 is a thermomotive device 23 in this instance comprising a bi-metallic strip 24 of horseshoe form mounted on a threaded stud 25 threaded in a threaded hole 26 in the partition 16. If desired a lock nut 25a may be provided on the stud 25. Developed flat the bi-metallic strip 24 appears as shown in Figure 4. The strip 24 proper is relatively narrow and is provided with enlarged ends 27, 28 having apertures 29. The aperture 29 in the end 27 is disposed about the stud 25 and this end may be held in position on the stud by nuts 30 (Figure 2). The other end, 28, of the bi-metallic strip 24 carries a contact 31 having a shank 32 disposed through insulation 33 disposed between the shank and the aperture 29 in the end 28.

The contact 31 is cooperable with a relatively stationary contact 34 provided in this instance by the end of a screw 35 cooperating with a threaded hole 36 in the stud 25 (Figure 2.) The screw 35 may be provided with any suitable means for adjusting it as for example a nut or a knurled collar 38 fastened thereto. The screw 35 may be held in adjusted position by a nut 39.

The bi-metallic strip 24 is provided with a heating coil 40, the lower end of the coil (as viewed in Figure 1) being connected to the shank 32 of the contact 31 and the upper end, as viewed in Figure 1, being connected by a conductor 41 to the shell 42 of a lamp socket suitably mounted in this instance on the partition 16. The shell 42 of the lamp socket and hence also the upper end of the coil 40 is electrically connected by a conductor 43 to a terminal plug 44 extending through a wall of the chamber 15 and supported and insulated therefrom by insulation 45. The terminal 44 may be connected by any suitable connection means to one terminal of a battery 46 (Figure 3) or other suitable source of electric current. The other terminal of the battery is here shown as grounded. The bi-metallic strip 24 is so constructed that when heated the contact 31 tends to move away from the contact 34.

Disposed in the chamber 14 is a thermomotive device 47 in this instance comprising a bi-metallic strip 48 of horseshoe form mounted on the upper end of the stud 25. The bi-metallic strip 47 is similar to the bi-metallic strip 24, one end, 27a, being held in position on the stud 25 by nuts 30a and the other end, 28a, carrying a contact 49 having a shank 50 and insulated from the strip by insulation 51.

The bi-metallic strip 48 is provided with a heating coil 52 the lower end of which is connected to the stud 25, and hence to the contact 34, and the upper end of which is connected by conductor means 53 to the casing part 12. The casing 10 is grounded, and since as here shown the other terminal of the battery 46 is grounded, the upper end of the coil 52 is connected through ground to the grounded terminal of the battery. The conductor means 53 is here shown as including a metallic insert 54 interposed therein, this insert fitting in and extending through a hole in the partition 16.

The shank 50 of the contact 49 is here shown as connected by a conductor 55 to a metallic insert 56 fitting in and extending through a hole in the partition 16, the other end of the insert serving as a lamp socket contact for engagement by the central contact 57 of a lamp bulb 58. Any other suitable electroresponsive means may be used in place of the lamp 58.

The contact 49 is adapted to cooperate with a relatively stationary contact 60 fastened, in this instance, in any suitable way to a flexible wall means portion of the chamber 14, in this instance a circular metallic diaphragm 61 the margin of which engages a shoulder 62 on the part 11 and is fastened thereto in any suitable way to form a gas-tight joint. The bi-metallic strip 48 is so constructed that when heated the contact 49 tends to move away from the contact 60.

Means is provided to move the diaphragm 61 and hence the contact 60, to adjust the pressure between the contacts 49, 60, this means as here shown comprising a threaded boss 63 carried by and suitably fastened to the upper side of the diaphragm 61, and a shaft 64 having a reduced threaded end 65 cooperating with the threaded boss 63. The shaft 64 is freely rotatable in a hole 66 in the upper wall 67 of the casing part 11, and is provided with a collar 68 adapted to engage the outer surface of the wall 67. A spring 69 is provided for biasing the collar 68 and hence the shaft 64 downwardly the spring 69 engaging at its upper end the inner surface of a transverse flange 70 on a nut 71 screwed on a threaded cylindrical flange 72, on the wall 67, co-axial with the hole 66. The shaft 64 may be turned by a handle or knob 73 fastened to the shaft 64 by a set screw 74. The knob 73 is provided with a pointer 75 for cooperation with a temperature scale indicated by the legend, which may be marked on the adjacent surface of the upper wall 67 of the casing part 11, analogously to the scale shown in Figure 8, the indicia however being different as will more fully appear.

A wall of the casing part 12 may be provided with any suitable transparent window W through which the lamp 58 and other parts may be seen.

The operation of the embodiment of Figure 1 is as follows. It is assumed that the apparatus has been calibrated to give a desired indication when the temperature of the ambient air and hence the temperature of the casing is a certain number of degrees. The position of the contact 60 is such that a certain amount of contracting flexure of the strip 48 is caused, and the position of the contact 34 is such that a certain amount of spreading flexure of the strip 24 is caused. Assuming how that the apparatus is connected to the battery 46, current will flow through the coils 40, 52 in series. When the strip 24 is sufficienty heated it will expand and interrupt the circuit through the coils at the contacts 31, 34. As soon as the strip 24 cools the circuit will be completed again. This cycle will be rapidly repeated. Meanwhile the current flow through the coil 52 will heat up the strip 48. The equilibrium temperature which the strip 48 would attain in a standard gas, such as air for example may be adjusted by adjustment of the contact 34. A practical temperature is 100° C., but any other desired suitable temperature may be selected. The temperature of equilibrium which the strip 48 reaches when the chamber 14 contains the gas to be tested will depend on the heat conductivity of the gas which in turn depends on the purity of the gas. For example, pure helium has a certain heat conductivity which will result in dissipation of heat from the thermomotive means 47 at a certain rate and hence will result in the temperature of the thermomotive means reaching a certain value. By previous calibration this temperature is insufficient to cause the contact 49 to be moved by the thermomotive means 47 out of engagement with the contact 60. Hence the circuit through the lamp 58 will remain completed. If however the gas in the chamber is say, 95% helium and 5% air, the heat conductivity is less than for pure helium so that the rate of heat dissipation from the thermomotive means 47 is less and the temperature it reaches will be higher. By previous calibration this temperature will cause the thermomotive means 47 to move the contact 49 out of engagement with the contact 60 and cause the lamp 58 to go out. Thus, if under the assumed conditions the helium in the chamber has a purity of, for example, 95% or less the lamp will go out and if the purity is in the range of above 95% to 100% the lamp will remain lighted. It will of course be apparent that the apparatus may be so constructed and arranged and adjusted that the lamp 58 will not go out unless the purity of the helium is any other selected minimum percentage.

In the foregoing it has been assumed that the apparatus has been calibrated and used at a given temperature of the casing 10. In order to compensate for the effect on the thermomotive means 47 of a change in the temperature of the casing from the temperature at which the apparatus was calibrated, the temperature of the casing 10 is determined and the knob 73 is turned until the pointer 75 indicates the casing temperature on the scale. This will adjust the position of the engaging contacts 49, 60. For example, if the temperature of the casing is lower than the temperature of calibration, turning of the knob 73 to that lower temperature mark on the temperature scale will cause the contact 60 to tend to move away from the contact 49 a certain amount, the contact 49 however following the contact 60 and remaining in engagement therewith at a new definite position. The strip 48 is then contractively flexed a less amount than before so that a definite lower temperature of the strip 48 will be required to cause separation of contacts 49, 60 thereby compensating for the lower casing temperature. It will of course be apparent that if the temperature of the casing 10 is higher than that at which the apparatus was calibrated, the knob 73 will be turned in the other direction to that higher temperature on the temperature scale, whereby the contact 60 is moved in a direction toward the contact 49 resulting in slightly further contractively flexing the strip 48 a definite amount. The amount that the contact 60 must be moved in a direction toward or away from the contact 49 to compensate for a departure in the casing temperature from the temperature at which the apparatus was calibrated with respect to percentage of purity of the gas may be readily determined and the temperature scale accordingly calibrated.

Referring now to the embodiment shown in Figure 5, this apparatus comprises a casing 10b and casing parts 11b and 12b similar to the casing and casing parts 10, 11, and 12 of Figure 1, and similar chambers 14b, 15b are provided. Disposed in the chamber 14b for receiving the gas to be tested is a thermomotive device 80 comprising a bi-metallic strip 81 of horseshoe form mounted on a threaded stud 82 here shown as disposed through a hole in the insulating partition 16b and held by lock nuts 83. One end 27b of the strip 81 is enlarged and has an aperture through which passes a screw 84 threaded into the stud 82 and serving to hold the strip 81 in position. The other end 85 of the strip 81 carries a contact 86 which is in electrical contact with the strip 81.

The thermomotive means 80 comprises a heating coil 87 for the strip 81, the lower end of this coil being connected by a conductor 88 to a metal insert 89 fitting in and extending through a hole in the partition 16b, the other end of the insert 89 serving as a socket contact for cooperation with the central contact 90 of a ballast resistor 91 which may be in the form of a so-called ballast tube or any other suitable means for maintaining a substantially constant current through the coil 87 even with a substantial variation in voltage of the source of electricity.

The thermomotive means 80 is so constructed and arranged that an increase of temperature will cause expansive movement of the strip 81, that is, the contact 86 will be raised, the reverse being of course true for a decrease in temperature.

The ballast resistor 91 is here shown as in a socket the shell 92 of which is connected by a conductor 93 to a terminal of a switch 94 the other terminal of the switch being connected, by a conductor 95 extending through and insulated from the casing part 12b, or in any other suitable way, to a terminal of a battery 96 or other suitable source of electricity. The other terminal of the battery 96 is here shown as grounded.

The upper end of the coil 87 is here shown as connected by a conductor 97 to a metal insert 98 fitting in and extending through a hole in the partition 16b, the other end of the insert being connected by a conductor 97a to the lower terminal of a push button 99 (as viewed in Figure 5), this terminal being grounded to the casing by a conductor 97b. It will be evident that when the switch 94 is closed the coil 87 will be fed with current through the ballast resistor 91 from the battery 96.

The stud 82 and hence the strip 81 is electrically connected by a conductor 100 to a metal insert 101 fitting in and extending through the partition 16b, the other end of the insert serving as a socket contact for engagement by the central contact 102 of a lamp bulb 103 in a socket shell 104 which is connected by a conductor 105 to the shell 92 and hence to the upper terminal of the switch 94 through the conductor 93. The other end of the insert 101 is connected by a conductor 106, insulated from the shell 104, to the upper terminal of the push button 99.

Also disposed in the chamber 14b is a thermomotive device comprising a bi-metallic strip 110 of horseshoe form, not provided with any heating coil but otherwise similar to the strip 81 but of different length as will more fully appear. The strip 110 is mounted on a stud 111 in a manner similar to that in which the strip 81 is mounted on the stud 82. The stud 111 is here shown as threaded in a threaded hole in the upper wall 112 of the casing, a lock nut 113 being provided. The joint between the stud 111 and the wall 112 is preferably made gas-tight in any suitable way.

The thermomotive means or strip 110 carries in electrical contact therewith at its free end a contact 114 and is so constructed and arranged that a decrease of temperature will cause expansive movement of the strip, that is, the contact 114 will be lowered, the reverse being of course the case for an increase in temperature.

The construction and arrangement is such that normally the contacts 86, 114 are separated a certain distance (which may be adjusted by adjustment of either the stud 82 or 111) and so that the thermomotive device 80 may move the contact 86 into engagement with the contact 114. When that occurs a circuit is completed for the lamp 103 from the battery 96, through the switch 94, through the conductor 93, shell 92, conductor 105, shell 104, lamp 103, insert 101, conductor 100, strip 81, strip 110, to ground (the strip 110 being grounded by its conductive mounting on the casing) back to the grounded terminal of the battery 96. It is of course apparent that the lamp 103 will be lit when the gas in the chamber 14b is of a certain minimum purity according to the selected adjustment and calibration of the apparatus.

A wall of the casing part 12b may be provided with any suitable transparent window Wb through which the lamp 103 and other parts may be seen.

The push button 99 has a movable member 115 adapted to electrically connect the upper and lower terminals of the push button and it will be evident that when so connected the contacts 86, 114 will be by-passed, the insert 101 being thereby grounded, so that the lamp 103 will light, if in operable condition. The push button 99 thus provides means for testing whether the lamp 103 is in operable condition.

The purpose of the thermomotive means 110 is to compensate automatically for temperature-responsive movement of the thermomotive means 80 caused by a change in the temperature of the casing 10b from the temperature at which the apparatus was calibrated. If, for example, the temperature of the casing 10b is a certain number of degrees lower than the temperature of calibration, the construction and arrangement is such that the thermomotive means 110 will have caused the contact 114 to have moved to a lower position, as viewed in Figure 5, and at the same time, the thermomotive means 80 will have caused the contact 86 to have moved to a lower position also, whereby, as far as the effect of a change in casing temperature is concerned, there will be no change in the relative position of the contacts 86, 114. However, the position of the contact 86 is influenced by the heat conductivity or purity of the gas in the chamber 14b, and if the purity of the gas is a predetermined selected minimum the temperature of the thermomotive means 80 will have been increased to a value such that the strip 81 will have expanded sufficiently to cause the contact 86 to engage the contact 114, thereby lighting the lamp 103.

The compensating thermomotive means 110 may be readily constructed to properly position the contact to give accurate temperature compensation. There is a definite relation between a temperature change of the casing 10b and the temperature change caused thereby in the thermomotive means. For example, in a particular apparatus built embodying the invention a drop in temperature of the casing 10b of one degree causes a drop in temperature eight-tenths of a degree in the heated thermomotive means 80. The deflection caused by a change in temperature of either the strip 81 or the strip 110 is proportional to the square of the length of the respective strip. Hence if, in this instance, the strip 110 is made of a length equal to the square root of eight-tenths multiplied by the length of the strip 81, the deflection of each strip 81, 110, caused by a change in temperature of the casing will be the same and hence the desired compensating action will be attained.

Referring now to the embodiment shown in Figures 6 through 8. There is here shown a casing 120, in this instance of oblong rectangular form, which is here shown as having a partition 121 although the partition may be dispensed with. In the casing 120 is disposed a thermomotive means 122 comprising a bi-metallic strip 123 of horseshoe form an end 124 of one arm of which is mounted on an end 125 of one arm of another bi-metallic strip 126, the ends 124, 125 being spaced by a spacer member 127 and held together by a screw and nut 128, the screw being disposed through the ends 124, 125 and spacer 127. The end 129 of the other arm of the strip 126 is mounted on and held to any suitable bracket 130 by a screw and nut 131, the bracket being here shown as fastened to the bottom wall of the casing 120 by screws 132.

The thermomotive means 122 includes a heating coil 133 the lower end of which is connected by a conductor 134 to one terminal of a ballast resistor 135 similar to the ballast resistor 91, the other terminal of the ballast resistor 135 being connected by a conductor 136 to a conductor 137 one end of which is connected to a terminal of a switch 138, the other terminal of the switch being connected to a binding post 139. The upper terminal of the coil 133 is connected to the shank 141 of a contact 140 carried by and insulated from the upper arm of the strip 123. The shank 141 of the contact 140 is also connected by a conductor 142 to a binding post 143. Thus when the switch 138 is closed, the coil 133 will be supplied with current from a source of current 144 connected to the binding posts 139, 143 as indicated in Figure 7.

The contact 140 is cooperable with a relatively stationary adjustable contact 145 which is carried by and insulated from a disc 146 which seals an opening of a flexible wall portion of the casing 120, this flexible wall portion being in this instance a metallic bellows 147 the lower end of which is sealed by the disc 146. The upper end of the bellows 147 is fastened, in any suitable manner, gas-tight to the upper wall 148 of the casing 120. The contact 145 is connected by a conductor 149 to one terminal of a lamp 150, the other terminal of which is connected to the conductor 137. It will be evident that engagement of the contacts 140, 145 will result in lighting of the lamp.

The disc 146 is provided with a boss 151 having a threaded hole cooperable with the threaded end 152 of a shaft 153 which extends through a hole in the wall 148 and is rotatable in a bearing member 154 suitably fastened to or forming a part of the wall 148. The shaft 153 has a collar 155 adapted to bear against the top of the bearing member 154. A spring 156, disposed about the shaft 153, is provided, one end of the spring engaging the inside of the wall 148 and the other end engaging the boss 151, so that the boss, and hence the contact 145, is biased downwardly to a definite position as determined by the relation of the threaded boss 151 and shaft 152. The shaft 153 is rotatable by a knob 157 having a pointer 158 cooperable with a scale on the outer surface of the wall 148, the scale being designated in Figure 8 with the legend "Purity scale." Desirably the cooperating threads on the shaft 153 and boss 151 are of fine pitch so that a relatively large amount of rotation of the knob 157 will produce a small movement of the contact 145. The scale of Figure 8 may be calibrated and marked in percent of purity of the gas to be tested in any desired range from 100% purity to any desired lower percent purity within the selected desired range of the apparatus.

Nipples 19c, 21c correspond to the nipples 19, 21 of Figure 1 and serve the same purpose. The upper wall 148 of the casing is here shown as provided with an aperture in which is mounted a transparent member here shown as prismatic lens 159 which serves to transmit light from the lamp 150.

If a partition 121 is used, and if the partition is metallic, the conductors 134, 142, 149 may extend through insulating bushings 160 disposed through holes in the partition.

The operation of the embodiment shown in Figures 6 through 8 is as follows: The strip 126 is so constructed that a rise in temperature will cause the arms thereof to spread relatively to each other, that is, the end 125 will rise carrying the strip 123 with it. On the other hand the strip 123 is so constructed that a rise in temperature will cause the arms thereof to approach relatively to each other, so that the contact 140 will move downwardly toward the end 124 of the strip 123. Obviously, a decrease in temperature will have the opposite respective effects on the strips. It will therefore be evident that as far as the casing temperature is concerned, the effect of a change in casing temperature on the position of the contact 140 will be nil, and any departure of the contact 140 from its normal position will depend on the temperature rise of the strip 123 caused by the coil 133 as influenced by the heat conductivity or purity of the gas to be tested.

By having the arms of the strips 123, 126 directed in the same direction in combination with the construction and arrangement hereinbefore set forth, the contact 140, considering the influence of casing temperature only, will remain in the same position and in general axial alinement with the contact 145, for a very wide range of casing temperatures. The contacts 140, 145 are therefore adapted to come into substantially flat engagement. It may be stated that for the full range of the apparatus, the movement of the contact 140 due to a rise in temperature caused by the coil 133 as influenced by the gas being tested is very small. The gas to be tested is introduced into the casing 120 and the switch 130 is closed, so that the coil 133 is fed with current from the source 144. The ballast resistor 135 keeps the current through the coil 133 substantially constant. Sufficient time is permitted to elapse to permit the thermomotive means 122 to reach a substantially constant temperature and then the knob 157 is turned to move the contact 145 toward the contact 140 until these contacts are in engagement which will be indicated by the lighting of the lamp 150. The pointer 158 then indicates the percent purity of the gas being tested this purity being directly readable on the purity scale. It will of course be apparent that the embodiment of Figures 6 through 8 may be used to measure the purity of a gas through the entire range of purities from 100% to any desired lower percentage.

While the invention has been described with reference to embodiments for the testing of helium or similar gas having greater heat conductivity than air, it will be evident to those skilled in the art that the invention may be readily embodied in apparatus for use in testing a gas the heat conductivity of which is less than that of air or some other component of impurity.

From the foregoing it will be apparent to those skilled in the art that each of the illustrated embodiments of the invention provides a new and improved means for testing gases and accordingly, each accomplishes the principal object of the invention. On the other hand, it also will be obvious to those skilled in the art that the illustrated embodiments of the invention may be variously changed and modified, or features thereof, singly or collectively embodied in other combinations than those illustrated, without departing from the spirit of the invention, or sacrificing all of the advantages thereof, and that accordingly, the disclosure herein is illustrative only, and the invention is not limited thereto.

I claim:

1. Means for testing a gas, comprising: relatively movable contacts; means, responsive to the purity of the gas to be tested, constructed and arranged to move one of said contacts relatively to the other to a position dependent upon the purity of said gas; means for adjusting the other of said contacts to engage said one of said contacts at said position; means for indicating when said contacts come into such engagement; and means, including a scale, for indicating the purity of said gas by the position of said adjusting means with respect to said scale.

2. Means for testing a gas, comprising: relatively movable contacts; thermomotive means, responsive to the purity of the gas to be tested, constructed and arranged to move one of said contacts relatively to the other to a position dependent upon the purity of said gas; means for adjusting the other of said contacts to engage said one of said contacts at said position; means for indicating when said contacts come into such engagement; means, including a scale, for indicating the purity of said gas by the position of said adjusting means with respect to said scale; and means for compensating for the effect of ambient temperature on said thermomotive means.

3. Means for testing a gas, comprising: casing means providing a chamber for containing gas to be tested and comprising flexible wall means; relatively movable contacts; means, disposed in said chamber and responsive to the purity of the gas to be tested, constructed and arranged to move one of said contacts relatively to the other; means whereby the other of said contacts is carried by said flexible wall means; and means, operatively related to said flexible wall means, constructed and arranged to move said flexible wall means to move said other of said contacts to adjust the position of at least said other of said contacts.

4. Means for testing a gas, comprising: a relatively stationary first contact; means, including a first U-shaped bi-metallic strip and a second contact mounted on a leg of said first strip, constructed and arranged to be responsive to the purity of the gas to be tested and move said second contact relatively to said first contact along a given line; means, including said contacts, constructed and arranged to indicate whether said gas is above or below a selected purity; and means, including a second U-shaped bi-metallic strip one leg of which is mounted on a relatively stationary support and the other leg of which is rigidly connected to the other leg of said first strip, constructed and arranged to compensate for the effect of ambient temperature on said purity responsive means and so that said path along which said second contact is movable by said purity responsive means remains substantially unaltered by the action of said second bi-metallic strip.

5. Means for testing a gas, comprising: relatively movable contacts; means, including thermomotive means and heating means for heating said thermomotive means, constructed and arranged to respond to a change in thermal conductivity of said gas due to change in purity of said gas, to move one of said contacts relatively to the other to a position dependent upon the purity of said gas; said heating means comprising an electric heater for supplying heat to said thermomotive means at a selected rate dependent only on the electrical energy supplied to said electric heater; means for adjusting the other of said contacts to engage said one of said contacts at said position; means for indicating when said contacts come into such engagement; and means, including a scale, for indicating the purity of said gas by the position of said adjusting means with respect to said scale.

6. Means for testing a gas, comprising: relatively movable contacts; means, including thermomotive means and heating means for said thermomotive means, constructed and arranged to respond to a change in thermal conductivity of said gas due to change in purity of said gas, to move one of said contacts relatively to the other to a position dependent upon the purity of said gas; said heating means comprising an electric heater for supplying heat to said thermomotive means at a selected rate dependent only on the electrical energy supplied to said electric heater; means for adjusting the other of said contacts to engage said one of said contacts at said position; means for indicating when said contacts come into such engagement; means, including a scale, for indicating the purity of said gas by the position of said adjusting means with respect to said scale; and means for compensating for the effect of ambient temperature on said thermomotive means.

EARL J. WEBER.

REFERENCES CITED

The following references are of record in the file of this patent:

UNITED STATES PATENTS

| Number | Name | Date |
|---|---|---|
| 1,185,211 | DiLegge | May 30, 1916 |
| 2,049,987 | Willenborg | Aug. 4, 1936 |
| 1,304,208 | Shakespear | May 20, 1919 |
| 1,504,707 | Peters | Aug. 12, 1924 |
| 2,345,772 | Robertson | Apr. 4, 1944 |

FOREIGN PATENTS

| Number | Country | Date |
|---|---|---|
| 505,565 | Great Britain | May 11, 1939 |